United States Patent [19]

Lubensky et al.

[11] Patent Number: 5,243,786
[45] Date of Patent: Sep. 14, 1993

[54] FOOT BOARD FOR A DOOR SILL IN AN AIRCRAFT PASSENGER DOOR

[75] Inventors: Gert Lubensky, Horneburg; Carsten Paul, Garstedt, both of Fed. Rep. of Germany

[73] Assignee: Deutsche Aerospace Airbus GmbH, Hamburg, Fed. Rep. of Germany

[21] Appl. No.: 942,979

[22] Filed: Sep. 10, 1992

[30] Foreign Application Priority Data

Sep. 24, 1991 [DE] Fed. Rep. of Germany ... 9111902[U]

[51] Int. Cl.$^5$ .............................................. E06B 1/70
[52] U.S. Cl. ................................... 49/471; 244/129.5; 244/129.1
[58] Field of Search .................... 244/129.5, 129.1; 49/471

[56] References Cited

U.S. PATENT DOCUMENTS

| | | | |
|---|---|---|---|
| 364,434 | 6/1887 | Pitmon | 49/471 |
| 448,501 | 3/1891 | Bussert | 49/471 |
| 837,474 | 12/1906 | Jewell | 49/471 |
| 2,570,336 | 10/1951 | Fouts | 49/471 X |
| 4,686,793 | 8/1987 | Mills | 49/471 |
| 5,012,614 | 5/1991 | Shea | 49/471 |

Primary Examiner—Robert J. Oberleitner
Assistant Examiner—Christopher P. Ellis
Attorney, Agent, or Firm—W. G. Fasse

[57] ABSTRACT

A foot board for an aircraft passenger door has an elongated nearly quadrilateral single piece construction with an inner and an outer longitudinal edge fastened by screw bolts to an aircraft door sill structure. The foot board is constructed as a one piece or integral milled component, extending over the entire width of the door sill, with an outward slope for drainage into a drainage collecting channel that receives any water from individual drainage channels feeding into the collecting channel running along the outer longitudinal edge of the foot board, and a rib is arranged between each of two neighboring drainage channels extending perpendicularly to the collecting channel. Each of the two ends of the collecting channel empties into a collecting basin having an outlet opening for collected liquids.

10 Claims, 6 Drawing Sheets

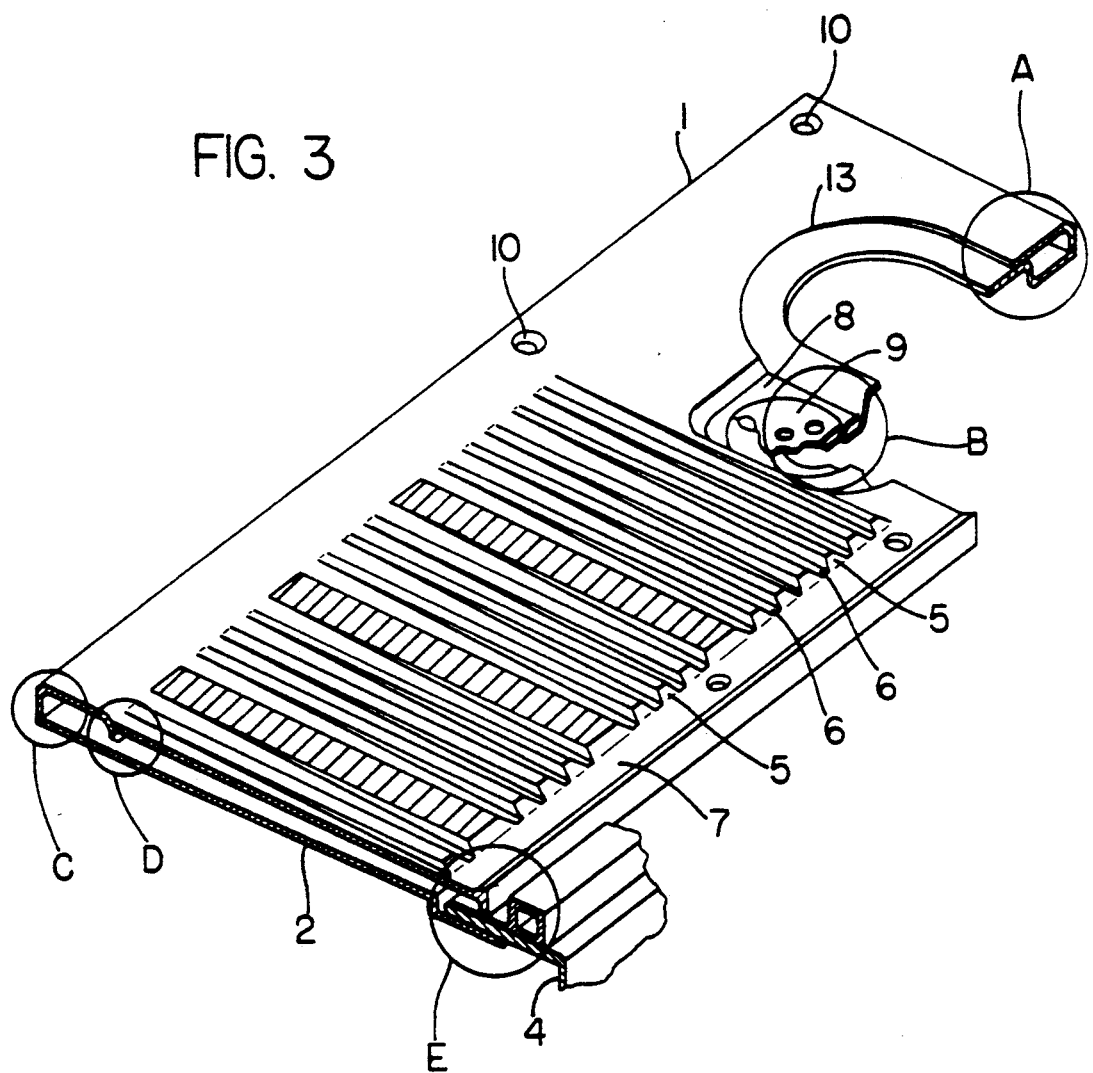

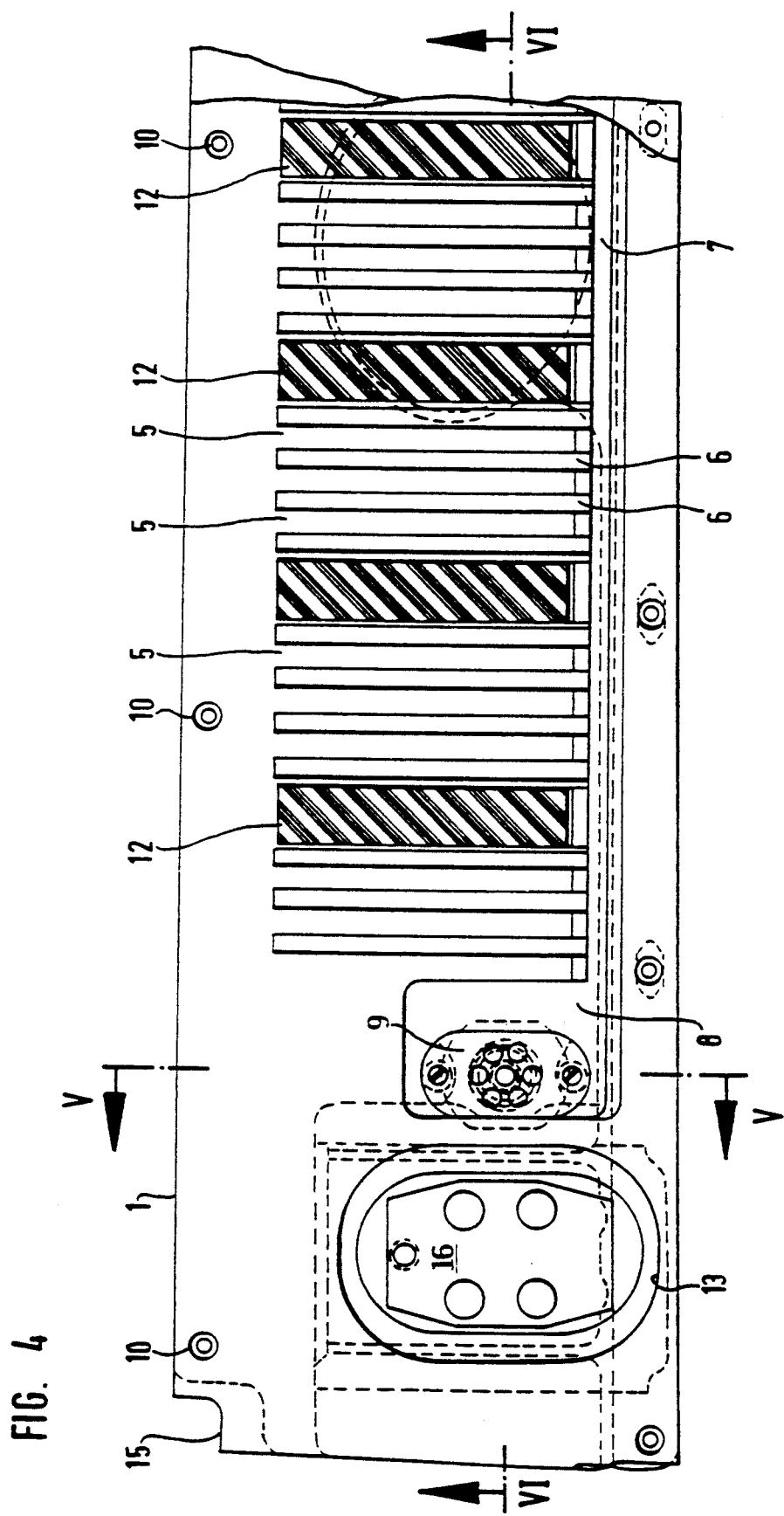

FOOT BOARD FOR A DOOR SILL IN AN AIRCRAFT PASSENGER DOOR

FIELD OF THE INVENTION

The invention relates to a foot board for a door sill in an aircraft passenger door. Such a foot board is essentially used to keep the door sill free of condensation and rain water, as well as to carry or transmit shearing forces in the floor construction.

BACKGROUND INFORMATION

Such foot boards have an elongated nearly quadrilateral shape with a longitudinal edge on the inboard side and a similar edge on the outboard side. The outboard longitudinal edge and the inboard longitudinal edge will in the following be called, in short, the outer and inner longitudinal edge, respecttively. A conventional foot board of this type is constructed with three components, so that the middle component is easily replaceable. The two side components are, however, replaceable only with a substantial labor effort. This conventional feature arises, in that in the case of a replacement of the side components, emergency slide hardware that is attached to the board's end regions must first be removed. Each of these components is constructed as a sandwich-late, whereby the structure into which the components are assembled including the foot board, form various hollow spaces that are difficult to drain. Such a conventional foot board, due to its assembly of a plurality of individual components, requires relatively high assembly costs.

OBJECTS OF THE INVENTION

In view of the above it is the aim of the invention to achieve the following objects singly or in combination:
  to construct a foot board of the type mentioned above, so that its replacement can be executed with a substantially reduced effort and expense;
  to provide a foot board construction that assures an effective drainage of the aircraft structure, into which the foot board is installed;
  to construct the board itself substantially as a single piece structure that can be manufactured with minimal expenditure; and
  to avoid the accumulation of water on the surface of the foot board.

SUMMARY OF THE INVENTION

These objects have been achieved by a board according to the invention which is characterized in that the foot board is constructed as a one piece or integral, preferably milled component, extending over the entire width of the door sill, with an outward slope for drainage into a drainage collecting channel that receives any water from individual drainage channels feeding into the collecting channel running along the outer longitudinal edge of the foot board, and wherein a rib is arranged between each of two drainage channels, and wherein each of the two ends of the collecting channel empties into a collecting basin having an outlet opening for collected liquids.

It is a special advantage of the invention that costly adjusting operations for the emergency slide hardware, after the replacement of the corresponding foot board, are no longer needed. Further, the single piece, integral construction substantially facilitates maintenance work. Further, surface water cannot collect on the foot board.

BRIEF DESCRIPTION OF THE DRAWINGS

In order that the invention may be clearly understood, it will now be described, by way of example, with reference to the accompanying drawings, wherein:

FIG. 3 and FIGS. 3A to 3E show perspective views of the right end of the foot board of FIG. 1 with the right front corner cut away, whereby FIGS. 3A to 3E show sectional details of areas A, B, C, D, and E in FIG. 3;

FIG. 4 is a partial top view of the foot board of FIG. 1, but now showing the left-hand end of the board structure when the viewer faces into an aircraft;

DETAILED DESCRIPTION OF PREFERRED EXAMPLE EMBODIMENTS AND OF THE BEST MODE OF THE INVENTION

Figure 1:
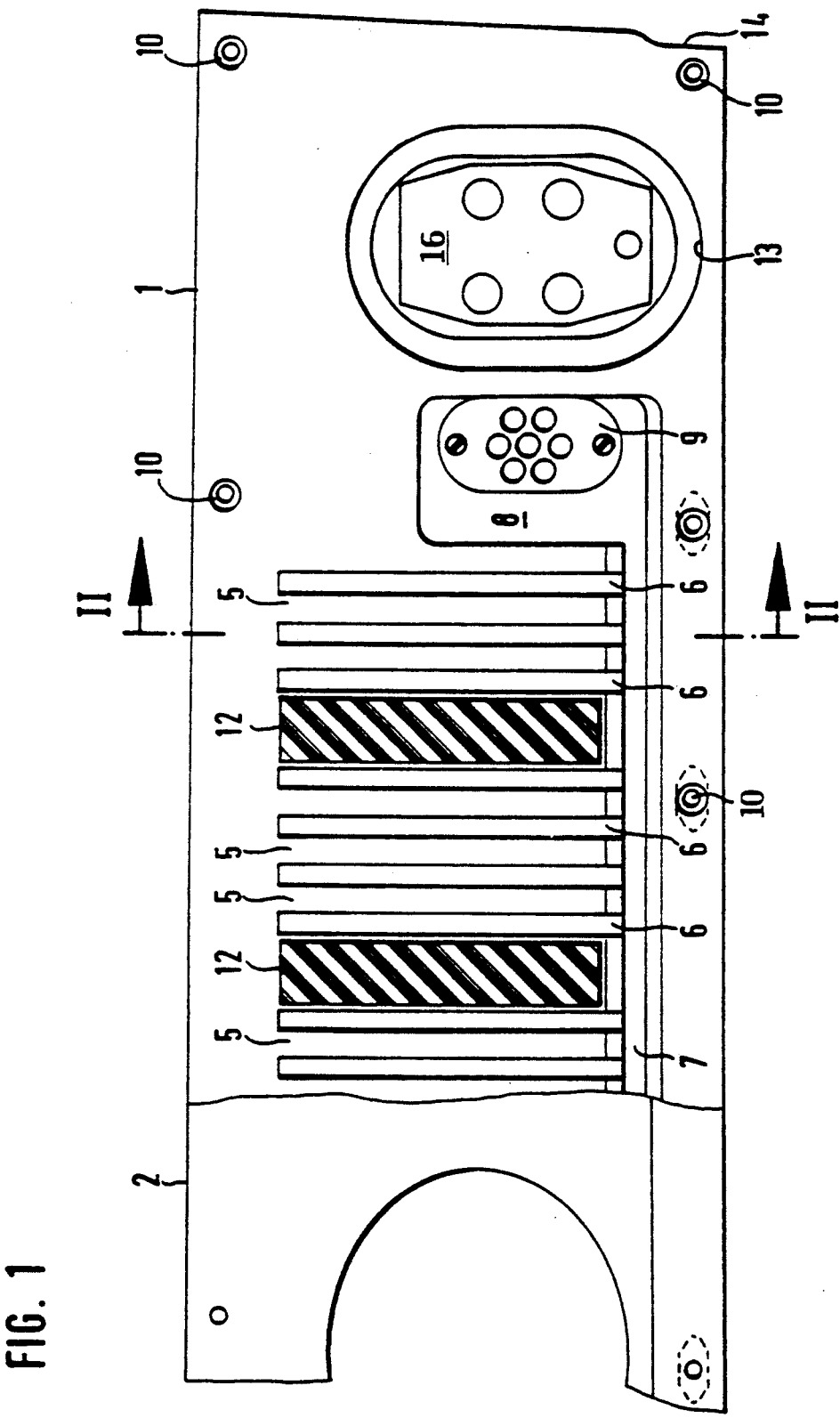
FIG. 1 is a partial top view on the foot board according to the invention showing the right-hand end thereof when facing into an aircraft.
Figure 2:
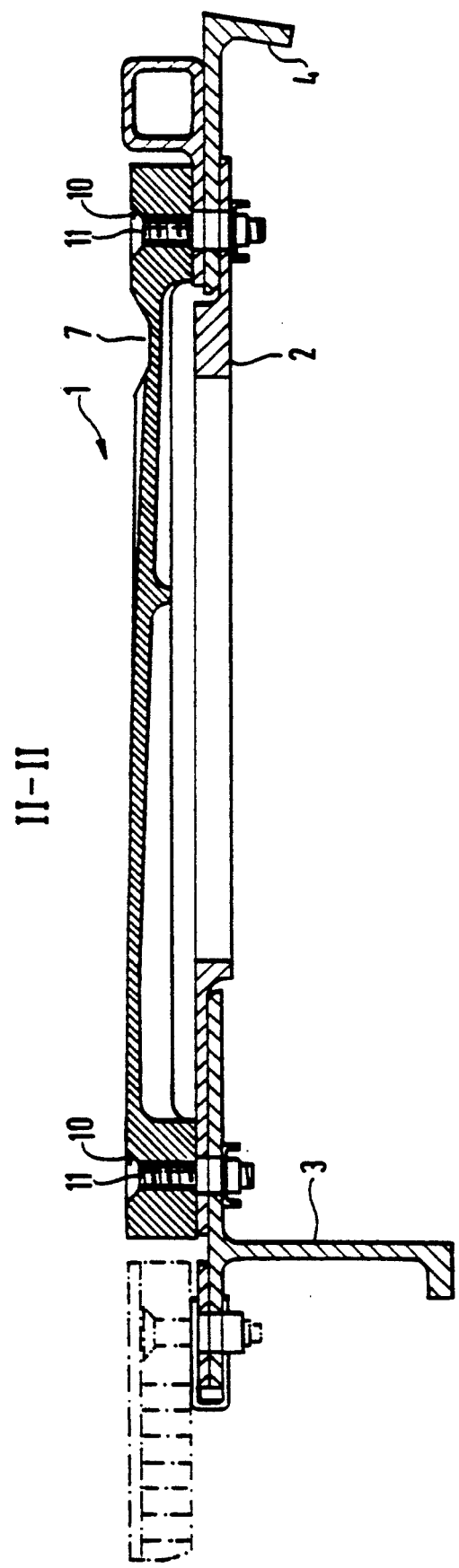
FIG. 2 is a cross-section along section line II—II of FIG. 1.
Figure 3A:
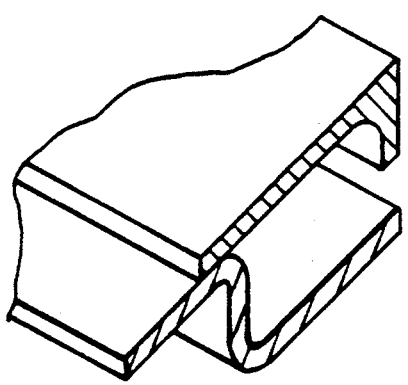
Figure 3B:
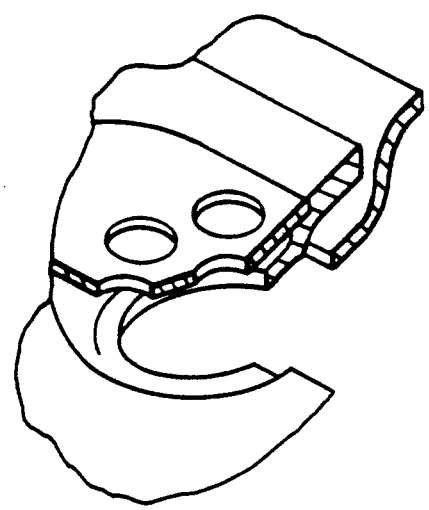
Figure 3C:
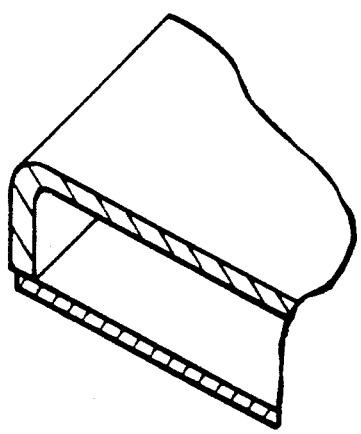
Figure 3D:
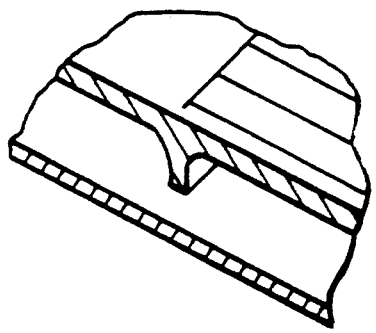
Figure 3E:
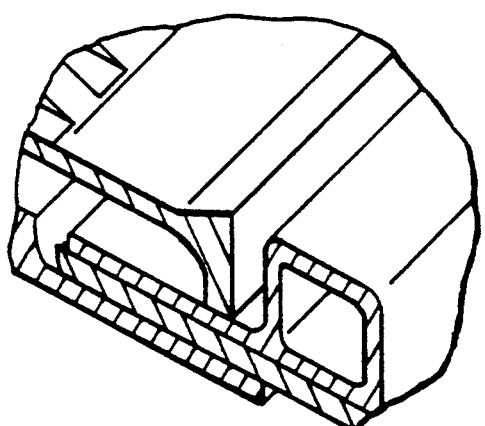

FIGS. 1 to 3 show the right-hand section of a foot board 1 of the present invention as viewed when entering an aircraft, with the door sill structure in a built-in state. This door sill structure comprises essentially a door threshold 2, a carrier 3, and an edge profile or section 4 forming part of the aircraft body wall. The upper surface of the single piece component foot board or body 1 has ribs 5. Drainage channels 6 are arranged between the individual ribs 5. These channels 6 empty into a collecting channel 7 connected with a collecting basin 8, that in turn is connected with a drainage funnel 18 shown in FIG. 6. The outlet opening to the drainage funnel is covered on top by a sieve lid 9. The foot board 1 has bore holes 10 for fastening the board to the sill structure by means of screw bolts 11. The thickness of the foot board 1 is larger in the region of the carrier 3 than in the region of the edge profile 4, so that the upper surface of the foot board 1 has a slope toward the edge profile 4. Wider surface regions 12 to which anti-skid strips may be glued, are arranged between the drainage channels 6 at a fixed distance from one another. In the right end portion of the foot board there is an oval opening 13 for fitting the foot board 1 to an element of the sill structure not shown. For the same purpose, the foot board 1 has a cut-out 14 at the bottom right corner shown in FIG. 1.

Figure 5:
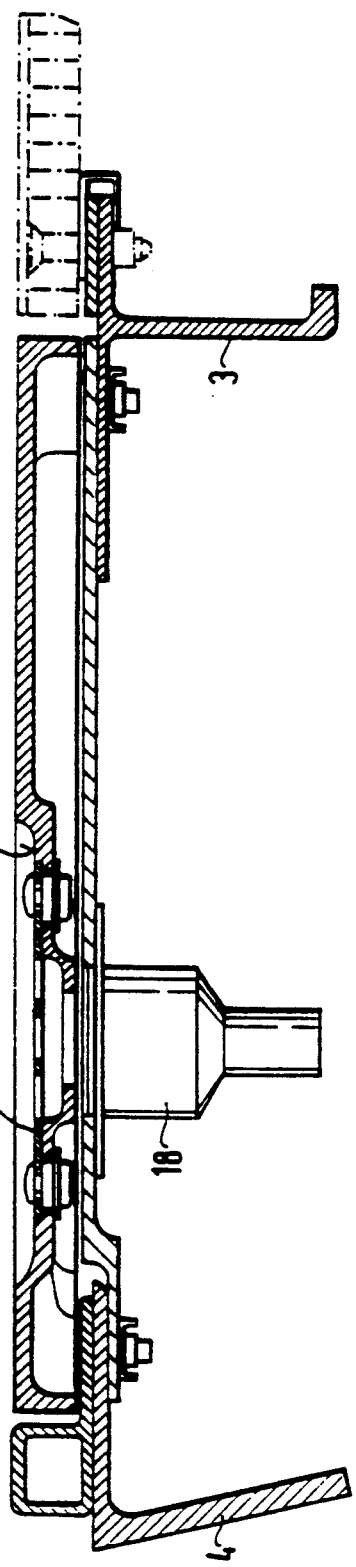
FIG. 5 is a cross-section along section line V—V in FIG. 4.
Figure 6:
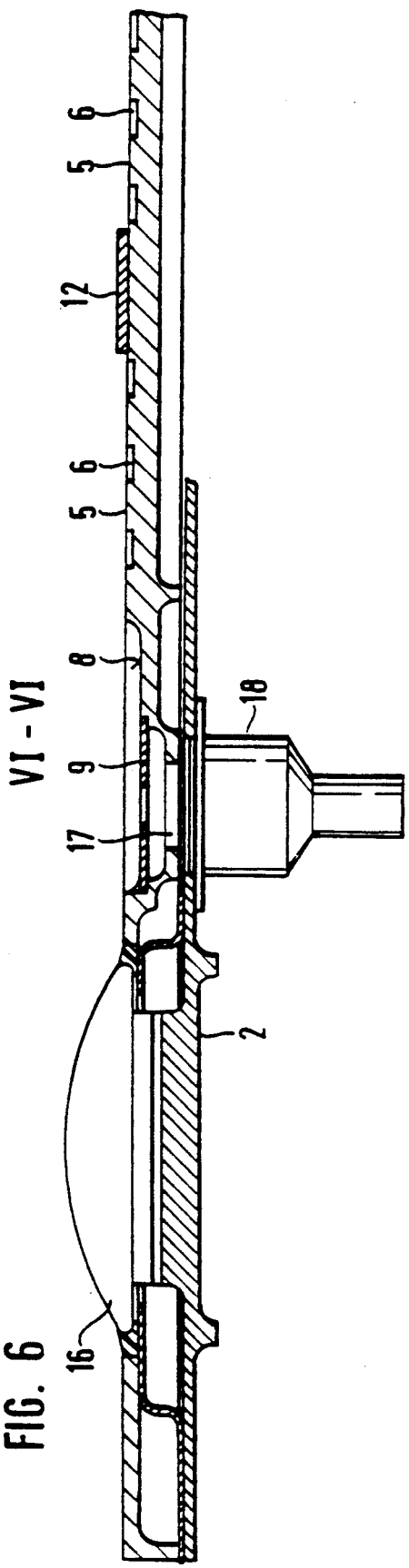
FIG. 6 is a partial section along section line VI—VI in FIG. 4.

FIGS. 4 to 6 show the left section of the foot board 1 also provided with ribs 5 and drainage channels 6 leading into the collecting channel 7, which at this left-hand end empties into another collecting basin 8 covered by a further sieve lid 9. The depth of all grooves 6 begins near the inner longitudinal edge of the sill structure and increases outwardly until upon merging into the collecting channel 7 the channel depth of the channel 6 is smaller than or equal to the depth of the collecting channel 7.

In FIG. 4 in the upper left corner area, there is a cut-out 15 for fitting the foot board onto the sill structure. An opening 13 is also found in the left end area of the foot board 1. As shown in the section of FIG. 6, a cleat 16 used for connecting an emergency slide, is rigidly connected to the door threshold 2. The construction of the openings 13 in the foot board 1 make it possible that the cleats 16 need not be removed if the foot board 1 is to be replaced. After the mounting of the foot board 1 is completed, the resulting seam between the cleat 16 and the foot board 1 is closed by means of a sealing compound.

Each end of the foot board 1 has an opening 13 for a respective cleat 16. As seen in FIG. 6, underneath the sieve lid 9, there is an outlet opening 17 which is connected with a drainage funnel 18 that is rigidly attached to the door threshold 2.

The described foot board or body 1 can be assembled with relatively minimal expenditure and is easily replaceable when repairs are needed. Further, the single piece or integral structure of the foot board or body is preferably formed by milling or casting aluminum or an aluminum alloy.

Although the invention has been described with reference to specific example embodiments, it will be appreciated that it is intended to cover all modifications and equivalents within the scope of the appended claims.

What we claim is:

1. A foot board for a vehicle door, comprising a single piece elongated board body having a length corresponding to a width of a door sill, a first longitudinal edge of said board body facing into said vehicle and a second longitudinal edge of said board body facing outwardly from said vehicle, mounting means in said longitudinal edges for securing said foot board structure to said door sill, a plurality of reinforcing ribs (5) forming upwardly open drainage channels extending crosswise between said longitudinal edges in said board body, said reinforcing ribs (5) having upper edges forming at least part of a tread surface of said foot board, a collecting channel (7) extending alongside said second longitudinal edge, said drainage channels formed by said reinforcing ribs (5) sloping toward and merging into said collecting channel (7), liquid collecting means at least at one end of said collecting channel, and means communicating said collecting channel with said liquid collecting means.

2. The foot board of claim 1, wherein said single piece elongated board body is a milled structure.

3. The foot board of claim 1, wherein said liquid collecting means comprises a collecting basin (8) at each end of said collecting channel which slopes toward said basins.

4. The foot board of claim 1, wherein said ribs (5) and said drainage channels (6) extend perpendicularly to said first and second longitudinal edges.

5. The foot board of claim 1, wherein said tread surface comprises additional tread surface areas arranged at nearly equal spacings between said ribs and said drainage channels, said additional tread surface areas carrying anti-slip means.

6. The foot board of claim 5, wherein said anti-slip means comprising rough surface, strips adhesively bonded to said tread surface areas.

7. The foot board of claim 1, further comprising openings (13) in said board body for fitting said foot board (1) to said door sill.

8. The foot board of claim 1, further comprising cutouts (14, 15) in said board body for fitting said foot board (1) to said door sill.

9. The foot board of claim 1, further comprising a sieve lid (9) for covering said liquid collecting means.

10. The foot board of claim 1, wherein said single piece elongated board body is a cast structure.

* * * * *

UNITED STATES PATENT AND TRADEMARK OFFICE
CERTIFICATE OF CORRECTION

PATENT NO.  : 5,243,786
DATED       : September 14, 1993
INVENTOR(S) : Gert Lubensky, Carsten Paul It is certified that error appears in the above-identified patent and that said Letters Patent is hereby corrected as shown below:

In claim 6 (column 4, line 24), replace "comprising" by
        --comprises--, delete ",".

Signed and Sealed this

Twenty-second Day of March, 1994

Attest:

BRUCE LEHMAN

Attesting Officer                Commissioner of Patents and Trademarks